Figure 1:
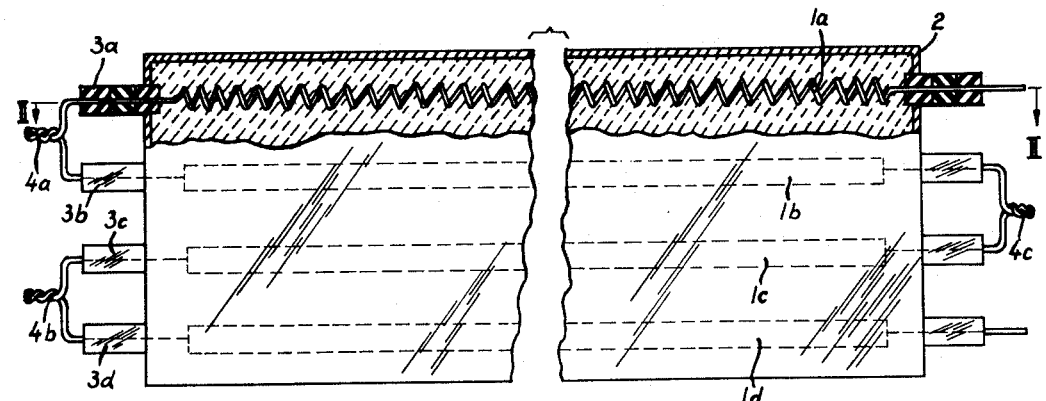

June 30, 1964   W. G. DE VERTER   3,139,517
ELECTRIC HEATING UNITS
Filed March 29, 1962

INVENTOR.
WALTON DeVERTER 3,139,517
ELECTRIC HEATING UNITS
Walton George De Verter, 1708 W. Belmont,
Chicago, Ill.
Filed Mar. 29, 1962, Ser. No. 183,529
4 Claims. (Cl. 219—525)

This invention relates in general to electrical melting pots and more particularly to improvements in heating units used therefor and in the methods of manufacture of such heating units.

Pots for melting waxes, solders, and the like, are heated by electrical units comprising resistance wire heating elements potted in a ceramic material. These heating units are attached to the pot housing to provide the necessary heat to melt the material placed within the pot.

In the past, these heating units have utilized resistance wire heating elements manufactured from one strip of resistance wire traversing the heating unit from one end to the other end and then making a U turn and traversing the unit again in the opposite direction. Thus, there are U turn at alternate ends. To obtain a maximum radiant surface, the heating elements resistance wire is spiral shaped.

These prior art heating units are expensive to manufacture because it is time-consuming and tedious to form the U shape turns in spiral shaped resistance wire and even more difficult to keep them in place for the potting operation. Also, the necessity of the space consuming U shape turns inherently limits the amount of heating elements that can be placed in each unit. This in turn seriously limits the usable heat output obtained per square inch of each heating unit. Another serious shortcoming of these heating elements is the uneven heating that they produce. More specifically, since there are more heating elements at the ends than in the center, the heating units receive more heat at their ends than at their middle sections.

Prior art devices have sought to overcome the shortcoming of uneven heat distribution by stretching and compressing the spirals in an attempt to equalize the area of heat producing elements throughout the heating units. This, at best, is an expensive hit-or-miss manual operation which only complicates the manufacturing problems and which does not result in an easily reproducible reliable product.

Accordingly, it is an object of this invention to provide new and improved heating units for use with melting pots.

It is another object of this invention to provide improved heating units having uniform heat-producing characteristics that produce a greater heat quantity per square inch.

It is still another object of this invention to provide an improved method of constructing heating elements which greatly increases the reliability and efficiency of the units.

It is yet another object of this invention to provide a more efficient, less expensive method of producing standard heating units which give uniform heat throughout its area.

In accordance with one aspect of this invention, the heating element is comprised of a plurality of spiraled coils of resistance wire rather than one continuous spiral. The individual coils are cut to extend from one end of the heating unit to the other end. The ends of the coil can be extended beyond the ends of the unit. The coils are placed at certain fixed distances apart, which distances are determined by the amount of heat required of the unit. The ends of the spirals are connected together as desired, so that the spirals are either serially wired, parallel wired or wired in a series parallel combination. This configuration results in readily produced, exceedingly efficient, units which will reliably give uniform predetermined amounts of heat and can be manufactured speedily and inexpensively.

Figure 2:
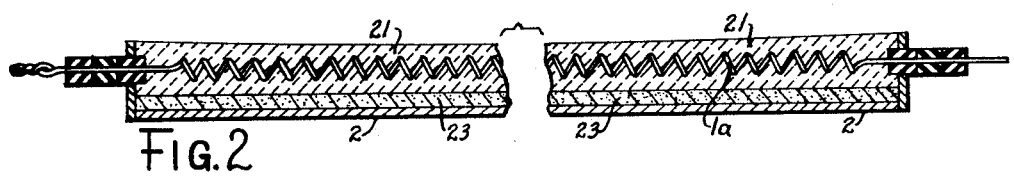

The above mentioned and other objects of this invention and the manner of attaining them will become more apparent and the invention itself will be best understood by reference to the following description of a preferred embodiment of the invention, taken in conjunction with the accompanying drawings, wherein:

FIG. 1 is a partially broken view of a single unit assembly constructed in accordance with the invention; and FIG. 2 is a view of the heating unit taken along line II—II of FIG. 1.

As shown in the drawings, the heating unit comprises a plurality of integral spiral coils, such as coils 1a, 1b, 1c and 1d of high resistance wire suspended in a ceramic base. A metal casing 2 is provided, having one side thereof exposed to form a receptacle for a base material, such as, but not limited to, ceramic paste of aluminum oxide and water. The coiled elements are set in the insulating ceramic slip, spaced apart at whatever distance is required to produce the desired heating pattern. After the elements are set in the ceramic and before the curing of the ceramic is completed, the unit is placed with its ceramic side against the solder pot with which it will be used. By this method, the unit is molded to the contour of the pot and the heating efficiency is enhanced.

Each of the coil ends pass through insulating terminals such as 3a, 3b, 3c, and 3d. The wires then are connected by twisting them together and welding them as shown at connections over 4a, 4b, and 4c. Seperate connecting wires may be used which are low resistance conductors. This will ascertain that the heating occurs within the elements themselves. The use of another wire outside the element itself is possible because there it is not subjected to the oxidizing heat present within the element itself. The use of straight line coils obviates the necessity of arranging the windings of the coil by hand to give a uniform heat distribution pattern and also allows more elements to be placed in each unit. This results in greater heat output per unit. It should be noted that although the coils are shown connected serially, they could be course be connected similarly in parallel or in series-parralel, depending upon the heat distribution desired.

The method of manufacture wherein a straight line coil arrangement is utilized rather than U shaped coils are much easier to manufacture and hence comparatively inexpensive.

FIG. 2 shows the manner in which the coils, such as 1a are suspended within the ceramic base. The heating coil 1a is completely suspended within the ceramic base 21 to insulate the coil from the casing 2 and from any device such as a solder pot that the element is used to heat. To prevent any fortuitous contact between said coils and said casing, a second insulating means such as mica strip 23 may be positioned between the coil and the case.

Solder pots using heating units embodying the principles of this invention have maintained temperatures well above 1200° F. over the normal operating life span of the units. This accomplishment clearly emphasizes the advantages of the greater heating capabilities provided by the straight line integral heating elements whereby a greater number of elements could be used in the heating units. This arrangement provides a greater wattage output per square inch without adversely affecting the operating life of the heating units.

While my invention has been described in connection with specific apparatus, it is to be clearly understood that this description is made only by way of example and not as a limitation on the scope of my invention.

I claim:

1. An electrical heating unit for heating solder pots comprising a casing; ceramic base material means as a filling in said casing, said base material when used having a contour that mates one of said solder pots, heating elements comprised of separate, straight line, parallel spiral wound resistance wire suspended in said base material, thereby electrically insulated from said casing and from any exterior device to be heated by said unit, separate insulating means lying between said casing and said coils, input means connected to a first of said elements, output means interconnected to a last of said elements, means not integral to said elements for interconnecting said elements so that there is a current path through said elements whereby uniform heat is produced.

2. An electrical heating unit for use in heating a solder pot associated with said unit, said heating unit comprising a metallic casing, said casing shaped to form a pan like receptacle having a bottom and side walls, ceramic base material means filling said receptacle, said base material having an exposed side, said exposed side having a profile configuration that mates the profile of said associated solder pot, a plurality of heating elements, each of said elements comprising separate, spaced apart, parallel, integral spiral coils suspended in and supported by said base material, each of said coils being completely surrounded by said base material, said coils consisting of resistance wire, power input means coupled to a first and a last of said coils, means comprising low resistance wire attached to the ends of the coils and welded together for interconnecting said spiral coils to complete a current path from said power source through said coils, said low resistance wire being welded together outside of said casing and insulating terminal means for insulating the low resistance wire from the casing.

3. In the heating unit of claim 2 wherein said resistance wire is uninsulated resistance wire.

4. In the heating unit of claim 3 wherein each coil traverses the entire casing.

References Cited in the file of this patent

UNITED STATES PATENTS

| | | |
|---|---|---|
| 2,464,147 | Myers | Mar. 8, 1949 |
| 2,585,443 | Cox | Feb. 12, 1952 |
| 2,610,286 | Cox | Sept. 9, 1952 |
| 2,613,308 | La Mirand | Oct. 7, 1952 |
| 2,817,740 | Jackson | Dec. 24, 1957 |
| 2,844,696 | Custer | July 22, 1958 |
| 2,866,066 | Neely | Dec. 23, 1958 |
| 2,889,445 | Wolf | June 2, 1959 |
| 2,957,227 | Scott | Oct. 25, 1960 |

FOREIGN PATENTS

| | | |
|---|---|---|
| 807,350 | Great Britain | Jan. 14, 1959 |